United States Patent
Lee et al.

(10) Patent No.: US 6,804,204 B2
(45) Date of Patent: Oct. 12, 2004

(54) APPARATUS FOR A DIGITAL ECHO CANCELLER AND METHOD THEREFOR

(75) Inventors: Claymens Lee, Kaohsiung Hsien (TW); Jean-Ming Lee, Hsinchu (TW)

(73) Assignee: Topic Semiconductor Corp., Hsinchu (TW)

( * ) Notice: Subject to any disclaimer, the term of this patent is extended or adjusted under 35 U.S.C. 154(b) by 796 days.

(21) Appl. No.: 09/815,131

(22) Filed: Mar. 22, 2001

(65) Prior Publication Data

US 2002/0071400 A1 Jun. 13, 2002

(30) Foreign Application Priority Data

Dec. 8, 2000 (TW) ........................................ 89126183 A

(51) Int. Cl.$^7$ ................................................. H04B 3/30
(52) U.S. Cl. ...................... 370/286; 370/289; 370/290; 379/406.01; 379/406.05; 379/406.08
(58) Field of Search ................................ 370/276, 278, 370/286, 289, 290, 291, 293, 497, 519; 375/148; 379/406.01, 406.02, 406.03, 406.05, 406.06, 406.08

(56) References Cited

U.S. PATENT DOCUMENTS

| 5,535,149 | A | * | 7/1996 | Mori et al. .................. 708/322 |
| 5,859,907 | A | * | 1/1999 | Kawahara et al. ..... 379/406.08 |
| 6,351,457 | B1 | * | 2/2002 | Sugiyama .................... 370/290 |
| 6,442,274 | B1 | * | 8/2002 | Sugiyama .............. 379/406.08 |
| 6,678,376 | B1 | * | 1/2004 | Takahashi et al. ..... 379/406.01 |

* cited by examiner

Primary Examiner—Phirin Sam
(74) Attorney, Agent, or Firm—J.C. Patents

(57) ABSTRACT

An apparatus of a digital echo canceller and method therefor, a designed selector is used values of receiving and input signals to estimate the length of a cable. The response values of an insignificant part of the echo signal can be selected. Multiplication and addition operations are carried out in a response region of a significant part of the echo signal. An estimated echo signal is produced to cancel the echo signal, unnecessary operations and the cost of a hardware can be reduced.

8 Claims, 5 Drawing Sheets

APPARATUS FOR A DIGITAL ECHO CANCELLER AND METHOD THEREFOR

CROSS-REFERENCE TO RELATED APPLICATION

This application claims the priority benefit of Taiwan application serial no. 89126183, filed Dec. 8, 2000.

BACKGROUND OF THE INVENTION

1. Field of Invention

The present invention relates generally to a method and apparatus of a digital echo canceller. More particularly, the present invention relates to a method and apparatus of a digital echo canceller that only responds to echo signals to perform a multiplication-and-addition function.

2. Description of the Related Art

FIG. 1 illustrates a performance of a full-duplex digital transceiver. Both ends of the full-duplex digital transceiver are connected to a cable 22. Each end of the full-duplex digital transceiver has a transceiver 18 or 20. The transceiver 18 at the left end of the full-duplex digital transceiver comprises a transmitter (TX) 12, a receiver (RX) 14 and a hybrid circuit 16. The transmitter 12 and the receiver 14 are connected to the hybrid circuit 16 to perform receiving and transmitting signals.

If the transceiver 18 at the left end of the full-duplex digital transceiver is used as a near-end transceiver, the other transceiver at the right end will be a far-end transceiver. When the transmitter 12 transmits a signal to the far-end of the full-duplex digital transceiver 20, the transmitter will often not match the impedance of the far-end full-duplex digital transceiver 20 due to a transmitting cable 22. A far-end echo signal that will transmit to the near-end of the full-duplex digital transceiver 16 influences the received signal of the receiver 14. An interfering noise will occur.

To prevent the above-mentioned state from occurring, the conventional method will require designing a canceller to eliminate the echo signals. The structure illustrated in FIG. 2 of an adaptive finite impulse response digital echo canceller (adaptive FIR digital echo canceller). Xn signals are transmitted to a plurality of delay circuits D. Xn signals with an output of each delay circuit D to produce signals. These signals are multiplied respectively to a plurality of the significant coefficients $C_0, C_1, C_2, \ldots C_{N-2}, C_{N-1}$ to produce multiplied values. These values of the multiplication are then added together to produce a sum (the sum $\Sigma$ is shown on the FIG. 2). An estimated echo signal is thus produced to eliminate the interference noise.

The above mentioned structure transmits signals utilizing a longer transmitting cable and a higher frequency (for example, a gigabit ethernet case, at the sample rate of 125 Mhz) to produce an echo signal's length that is shown on FIG. 3 is approximately 80 EC taps long. When the length of the echo signal is longer, the number of the significant coefficients $C_0, C_1 \ldots C_{N-2}, C_{N-1}$ are required to multiply respectively to the signals that are transmitted by the delay circuits D of FIG. 2 will increase. As a result the amount of addition and multiplication operations that have to be calculated will also increase. The whole operation is not only complex, but the cost of the hardware is also high.

SUMMARY OF THE INVENTION

According to above, the present invention provides an installation of a digital echo canceller and method therefor.

It is an object of the present invention to operate a multiplication-and-addition according to an echo part that relates to an echo signal so that an unnecessary circuit design can be omitted.

The present invention provides an apparatus of a digital echo canceller. The digital echo canceller is suitable for a full-duplex digital transceiver to eliminate an echo signal that is produced by the full-duplex digital transceiver.

The receiver of the full-duplex digital transceiver is connected to a first receiving end and a second receiving end by a cable. From the first receiving end to produce an input signal.

The structure of the present invention comprises a plurality of first-set delay circuits, a selector, a plurality of second-set delay circuits, a plurality of multipliers and an adder. The plurality of first-set delay circuits comprise an input and an output, wherein the input and the output are connected in series. The first input received signals. The selector comprises an input and an output. The input is according to a length of a cable to select which part of the output of the first-set delay circuit to connect. The plurality of second-set delay circuit comprise a input and output, wherein the input and the output Are connected in series. The first input is connected to the output of the selector. The number of the plurality of the multipliers is the same as the second-set of the delay circuits. The multipliers are connected respectively to each output of the second-set delay circuits. Each of these multipliers multiplies respectively to an EC coefficient to produce signals. An addisor will receive all these signals that are produced from the multipliers and add these values together to produce a sum, wherein the sum is an estimated echo signal that will cancel the echo signal.

An echo number of an insignificant part that is produced by the echo signal depends on the length of a cable. The connecting operation of the selector's input is according to the response values of the insignificant part to decide which output of the first-set delay circuits shall be connected to.

An equation that calculates the length of a cable is $P_r = \int H_c^2(f)P(f)df$. Where P(f) is a frequency response of TX signal that is an input signal produced by one of the receiving end of the full-duplex digital transceiver; $H_c(f)$ is a frequency response of cable channel and $P_r$ is a received signal power that is produced from the other receiving end. From the equation, the cable length is directly related to $H_c(f)$ and P(f). The values of $H_c(f)$ and P(f) can be obtained from a table. We can then approximately estimate the cable length. We normally design the quantity of the second-set delay circuits the same as the response values of the significant part of the echo signal, for example, 20.

A designed selector is to estimate the length of a cable. The selector is according to the input signal and the received signal to decide the response values of the insignificant part of the echo signal. Multiplication and addition will carry out only at the response region of the significant part of the echo signal to produce an estimated echo signal. The estimated echo signal is to cancel the echo. This process can avoid unnecessary operation in order to reduce the cost of the hardware.

The present invention provides a method of a digital echo canceller which is suitable for a system of a full-duplex digital transceiver to produce a signal, wherein the signal is to cancel an echo signal. A cable is connected to a first receiving end and a second receiving end, the steps comprise: producing an input signal from the first receiving end; measuring a received signal from the second receiving end after transmission. The cable length is estimated according to the received signal and the input signal. The length of the cable decides a response value of an insignificant part of the echo signal. Values of a significant part of the echo signal are multiplied respectively to a plurality of significant coefficients. All the values after the multiplication are added together to produce an estimated echo signal. The estimated echo signal is to cancel the echo signal.

In the above-mentioned embodiment, the relationship of the received signal power $P_r$ that is directly related to the frequency response of TX signal $P(f)$ and the frequency response of the cable channel $H_c(f)$, wherein $P_r = H_c^2(f)P(f)$ $df$. The values of the $H_c(f)$ and $P(f)$ can be obtained from a table, and because the cable length is directly related to $H_c(f)$ and $P(f)$ therefore the cable length can be approximately estimated from the equation.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The conventional structure of a digital echo canceller utilizes a longer transmitting cable and a higher frequency, therefore the amount of multiplication and addition operations between the significant coefficients and the signals that are produced by the delay circuits increases. As a result the whole operation becomes complex and the cost of the hardware increases.

Figure 3:
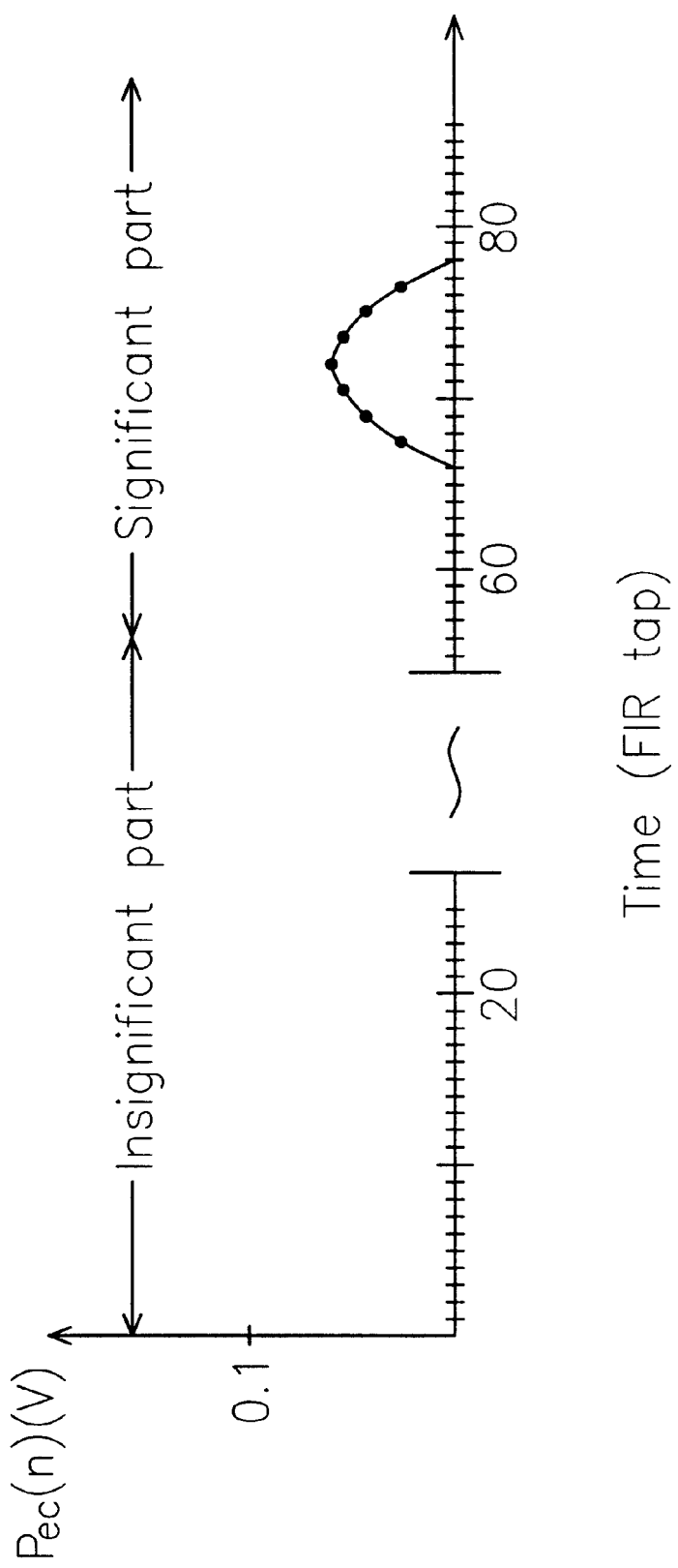
FIG. 3 is a graph of time(FIR tap) versus Pec(n)

According to the above-mentioned disadvantage, a method can be obtained from FIG. 3 to improve the conventional structure. FIG. 3 illustrates a graph of the echo signal distribution. According to the average calculation, the values of 10 cycles are normally used but in order to reduce the deviation, extra 10 cycles' values are taken into account for the calculation. The results that we obtained from the calculation can be divided into two parts, wherein the front part is an insignificant part and the latter part is a significant part. The length of the cable is directly related to the insignificant part and the significant part. Therefore once the length of the cable is obtained, the response values of the insignificant part of the echo signal can be selected.

The length of a cable can be calculated from an equation of $P_r = \int H_c^2(f)P(f)df$. Where $P(f)$ is a frequency response of TX signal that is an input signal produced by one of the receiving end of the full-duplex digital transceiver; $H_c(f)$ is a frequency response of cable channel and $P_r$ is a received signal power that is produced from the other receiving end. From the equation, the cable length is directly related to $H_c(f)$ and $P(f)$. The values of $H_c(f)$ and $P(f)$ can be obtained from a table. We can then approximately estimate the cable length.

Once the response values of the insignificant part are selected, we can carry out the multiplication and addition operations to the response region of the significant part of the echo signal only. The result is to obtain an estimated echo signal to cancel the echo. Therefore, multiplication and addition calculations of the insignificant part can be omitted, and the cost of the hardware can be reduced.

Figure 1:
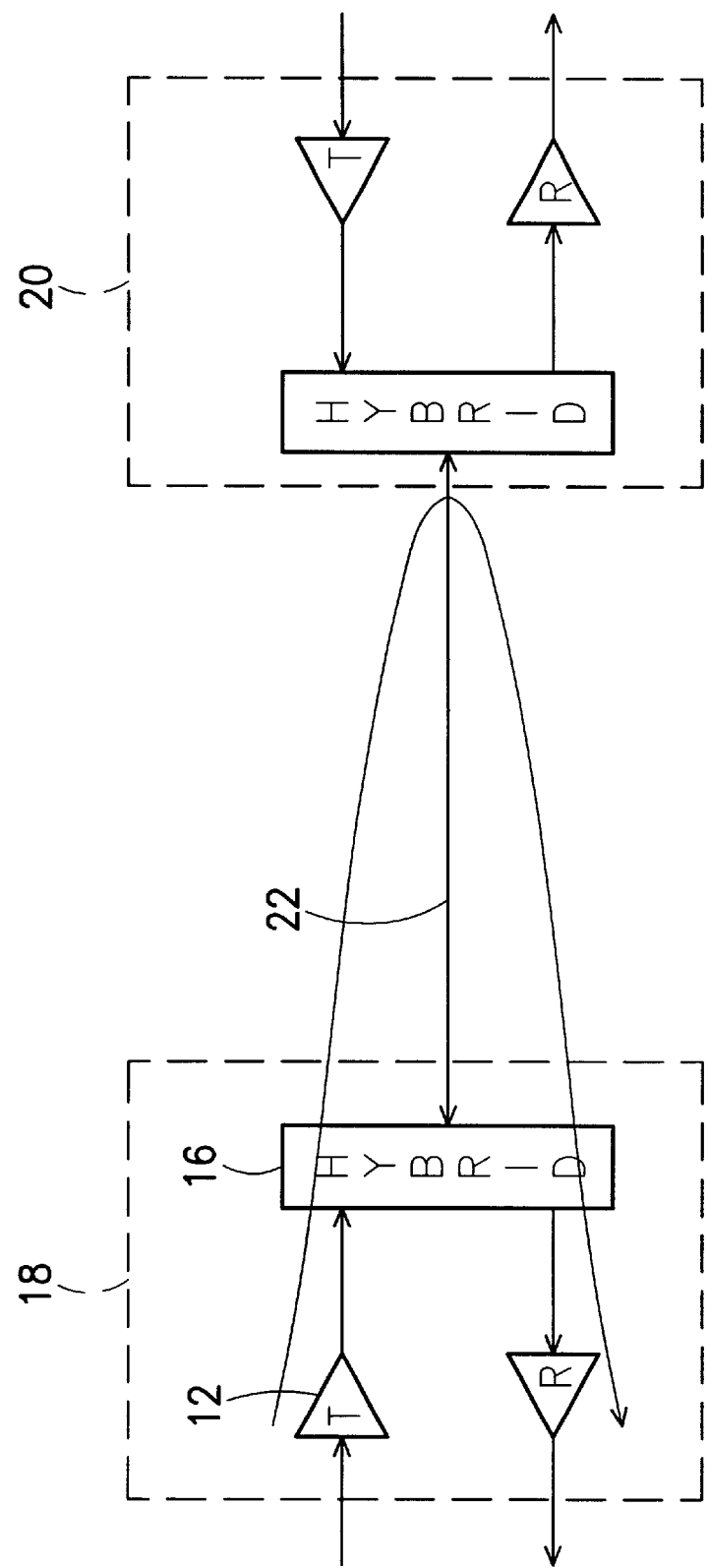
FIG. 1 is a diagram illustrates a performance of a full-duplex digital transceiver.
Figure 2:
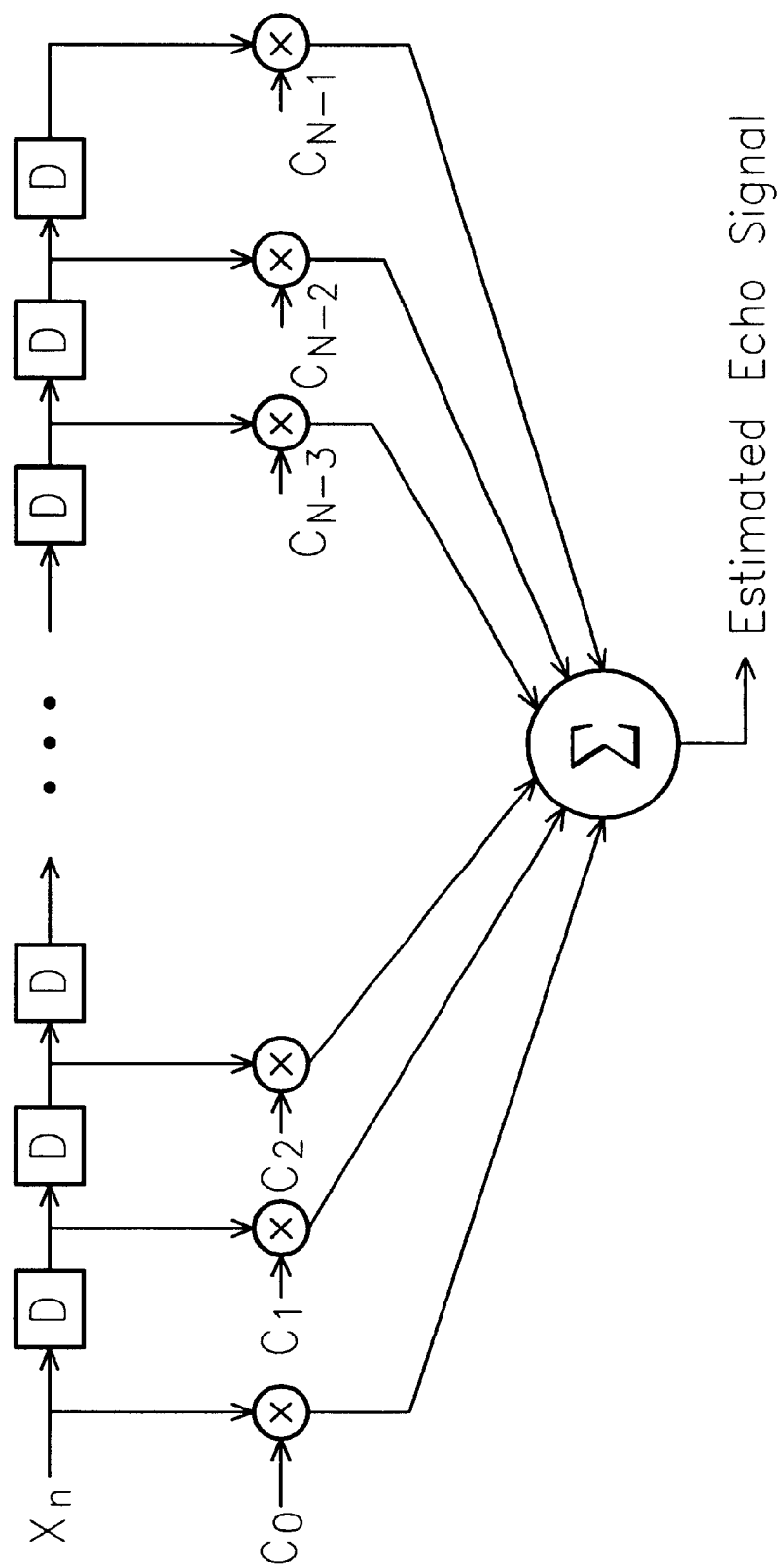
FIG. 2 is a diagram illustrates a structure of an adaptive FIR digital echo canceller.
Figure 4:
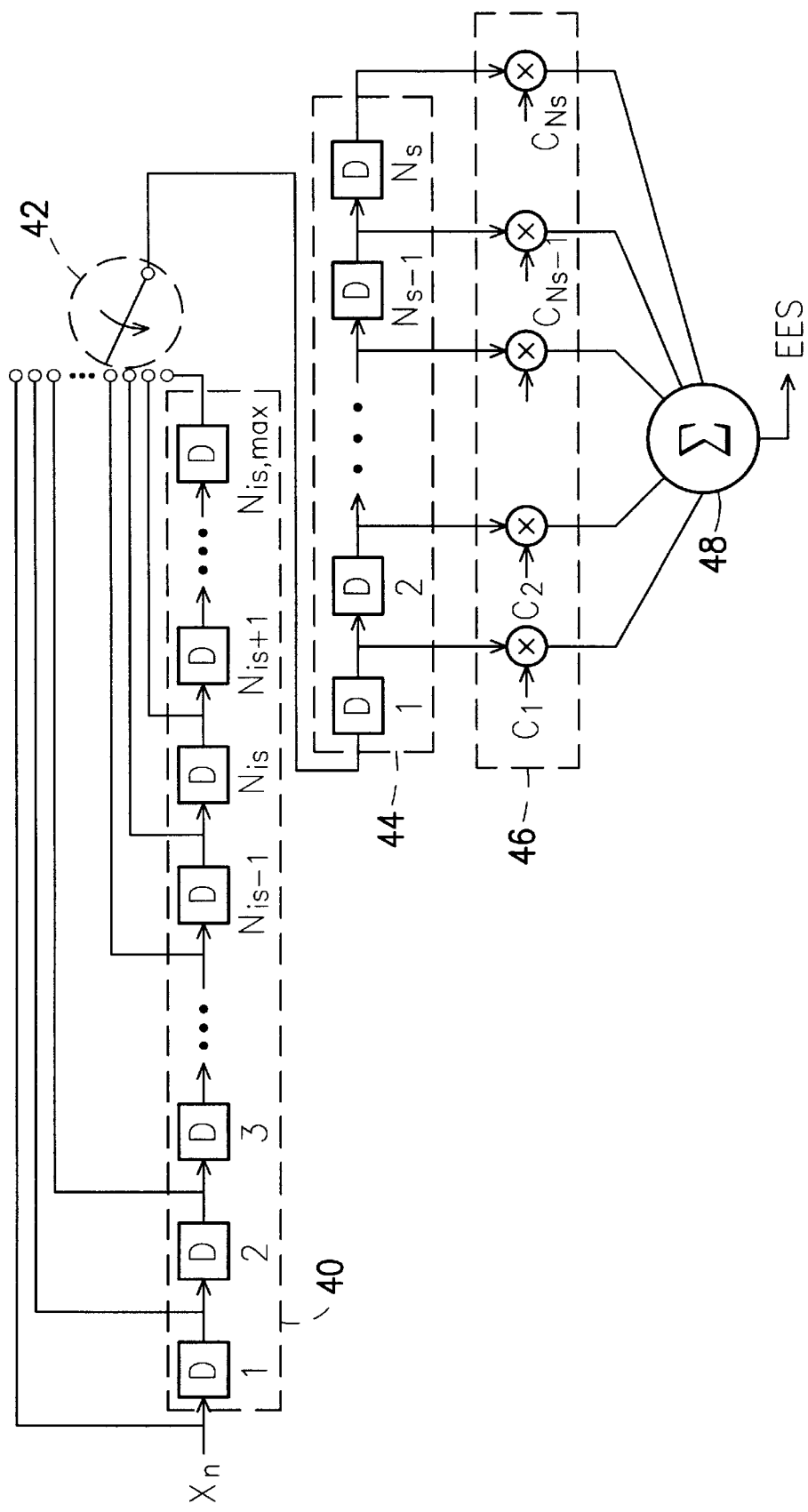
FIG. 4 is a diagram illustrates an installation of a digital echo canceller according to a preferred embodiment of the present invention.

FIG. 4 is a diagram illustrates an apparatus of a digital echo canceller according to a preferred embodiment of the present invention. The apparatus comprises a full-duplex digital transceiver that is shown on FIG. 1. A cable is connected to the first receiving end (near-end) and the second receiving end (far-end) of the full-duplex digital transceiver to eliminate the echo signal that is produced.

The structure of the present invention comprises a plurality of a first-set delay circuits 40, a selector 42, a plurality of second-set delay circuits 44, a plurality of multipliers and an adder 48.

The inputs and the outputs of the first-set delay circuits 40 (shown on FIG. 4, 1, 2, 3 . . . $N_{is+1}$, $N_{is,max}$) are connected in series. The first input is connected to the first output the full-duplex digital transceiver to transmit an input signal Xn.

The input of the selector 42 is connected to one of the output of the first-set delay circuits. The choosing target is on the response region of the significant part, and the choosing method is according to the length of the cable. Because once the cable length is obtained, the response values of the insignificant part of the echo signal can be selected. The input of the selector will then connect directly to one of the output of the first-set delay circuits 40 that are in the response region of the significant part.

The second-set of the delay circuits 44 are also connected in series, and its first input is connected to the output of the selector 42. Once the selector 42 receives signals from first-set circuits 40, it will transmit these signals to the second-set delay circuits 44. There are 20 second-set delay circuits that are shown in FIG. 3 (between 60–80 region).

The number of the second-set delay circuits is the same as the number of the significant part of the first-set delay circuits. There are 20 multipliers 46 are installed and connected respectively to the output of the second-set delay circuits. When the outputs of the second-set delay circuits transmit signals out, These signals will be multiplied respectively to the significant coefficients to produce multiplied values. An adder 48 will then add all these values together to produce an estimated echo signal (EES). The estimated echo signal will cancel the echo signal.

Figure 5:
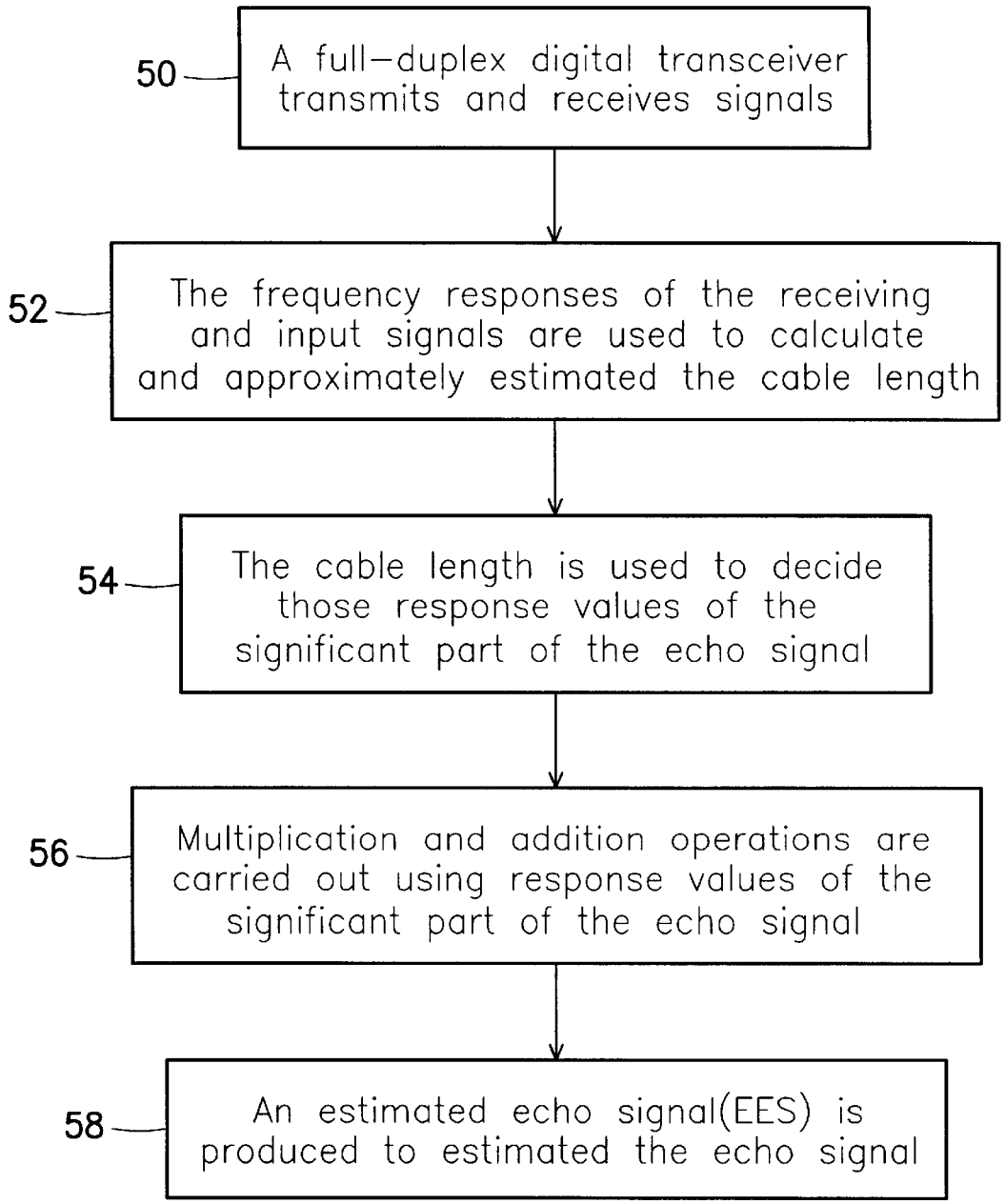
FIG. 5 is a process flow diagram of a method of a digital echo canceller according to a preferred embodiment of the present invention.

The present invention provides a method of a digital echo canceller. Referring FIG. 5, a process flow of the present invention is shown. The process comprises as followed. In step 50, a transmitting end of a full-duplex digital transceiver (refer to FIG. 1) transmits an input signal. Its second transmitting end will receive a receiving signal after detecting the first transmission. In step 52, the values of the input and receiving signals are used and applied into an equation $P_r = \int H_c^2(f)P(f)df$ to approximately estimate the length of the cable. In step 54, from the cable length to select response values of the significant part of the echo signal. In step 56, multiplication and addition operations are carried out using the selected response values of the significant part. In step 58, an estimated echo signal is produced to eliminate the echo signal.

It is an object of the present invention to reduce the calculation time and simplify the operation process in order to reduce the cost of the hardware.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A digital echo canceller, suitable for a full-duplex digital echo transceiver, wherein the canceller is used for canceling an echo signal produced by the full-duplex digital echo transceiver, wherein a cable is connected to a first transceiving terminal to a second transceiving terminal of the full-duplex digital echo transceiver, wherein an input signal is inputted into the first transceiving terminal, the digital echo canceller comprises:

a first set of delay circuits, each of the first set delay circuits has an input terminal and an output terminal, wherein the delay circuits are connected in series, a first input terminal of the serially connected delay circuits being used for receiving the input signal;

a selector, having an input terminal and an output terminal, for selecting one of the output terminals of the first set of the delay circuits for connection according to the length of the cable;

a second set of delay circuits, each of the second set delay circuits has an input terminal and an output terminal, wherein the delay circuits are connected in series, a first input terminal of the serially connected delay circuits being coupled to the output terminal of the selector;

a plurality of multipliers, wherein the number of the multipliers is the same as the number of the delay circuits of the second set, each of the multipliers being respectively connected to one of the output terminal of the delay circuits of the second set, each of the multipliers being used for generating a multiple coefficient after performing multiplying operation upon an output from the connected delay circuit and a significant coefficient form an external source; and an adder, for receiving all of the multiple coefficients from the multipliers and performing addition operation upon the multiple coefficients to generate an estimated echo signal, whereby the echo signal produced by the full-duplex digital echo transceiver is cancelled by the estimated echo signal.

2. The digital echo canceller of claim 1, wherein the selector is according to the cable length to decide a response value of an insignificant part, which is generated by the echo signal, thereby one of the output terminals of the first-set delay circuits is selected for connection.

3. The digital echo canceller of claim 2, wherein the cable length is calculated from an equation $P_r = \int H_c^2(f)P(f)df$, where P(f) is a frequency response of TX signal, which is an input signal produced by one of the transceiving terminals of the full-duplex digital transceiver, $H_c(f)$ is a frequency response of cable channel and $P_r$ is a received signal power that is produced from the other transceiving terminal; the values of P(f) and $H_c(f)$ that can be obtained from a table are applied into the equation, an approximately estimated cable length can be obtained.

4. The digital echo canceller of claim 1, wherein the number of the second-set delay circuits is the same as the response values of the significant part of the echo signal.

5. The digital echo canceller of claim 4, wherein the number of the response values of the significant part is 20.

6. A method of a digital echo canceller, suitable for a full-duplex digital transceiver, wherein the canceller is used for canceling an echo signal produced by the full-duplex digital transceiver, wherein a cable is connected to a first transceiving terminal to a second transceiving terminal of the full-duplex digital canceller, the steps of the method comprising:

transmitting an input signal from the first transceiving terminal, and detecting a receiving signal produced by the second transceiving terminal after the first transmission;

estimating a length of the cable in accordance with the input signal and the receiving signal;

deciding a response value of an insignificant part, which is generated by the echo signal in accordance with the estimated length of the cable; and selecting a significant part, which is generated by the echo signal is multiplied to a plurality of multiple coefficients produced by a plurality of multiplier, and adding the multiple coefficients to generate an estimated echo signal, thereby the echo signal produced by the full-duplex digital echo canceller is cancelled by the estimated echo signal.

7. The method of claim 6, wherein the values of the input and receiving signals are used to estimate approximately of the cable length from an equation $P_r = \int H_c^2(f)P(f)df$, wherein P(f) is a frequency response of TX signal that is an input signal produced by one of the receiving end of the full-duplex digital transceiver, $H_c(f)$ is a frequency response of cable channel and $P_r$ is a received signal power that is produced from the other receiving end.

8. The method of claim 6, wherein the response number of the significant part of the echo signal is 20.

* * * * *